United States Patent [19]

Castelain et al.

[11] Patent Number: 5,357,502
[45] Date of Patent: Oct. 18, 1994

[54] DEVICE FOR THE RECEPTION OF DIGITAL DATA TIME FREQUENCY INTERLACING, NOTABLY FOR RADIO BROADCASTING AT HIGH BIT RATE TOWARDS MOBILE RECEIVERS WITH NYQUIST TEMPORAL WINDOW

[75] Inventors: Damien Castelain; Joël Richard; Roselyne Halbert-Lasselle, all of Rennes; Daniel Pommier, Breal Sous Montfort, all of France

[73] Assignee: France Telecom and Telediffusion de France SA, Paris, France

[21] Appl. No.: 39,964

[22] Filed: Mar. 30, 1993

Related U.S. Application Data

[63] Continuation-in-part of Ser. No. 648,897, Jan. 31, 1991, abandoned.

[30] Foreign Application Priority Data

Feb. 6, 1990 [FR] France .................................. 90 01493

[51] Int. Cl.$^5$ .......................... H04B 7/02; H04L 1/02
[52] U.S. Cl. ........................................ 370/19; 375/38; 375/58; 375/100; 455/52.1; 455/59
[58] Field of Search ............................... 370/6, 18–21, 370/23, 50, 69.1, 70, 95.1; 375/38–40, 58, 60, 99, 100; 455/50.1, 54.1, 59, 63, 52.1; 364/725, 726, 727

[56] References Cited

U.S. PATENT DOCUMENTS

| | | | |
|---|---|---|---|
| 3,488,445 | 1/1970 | Chang | 370/19 |
| 4,615,040 | 9/1986 | Mojoli et al. | 375/58 |
| 4,641,318 | 2/1987 | Addeo | 375/58 |
| 4,731,800 | 3/1988 | Motley et al. | 375/58 |
| 4,881,241 | 11/1989 | Pommier et al. | 375/38 |
| 5,191,576 | 3/1993 | Pommier et la. | 370/18 |

*Primary Examiner*—Douglas W. Olms
*Assistant Examiner*—Hassan Kizou
*Attorney, Agent, or Firm*—Locke Reynolds

[57] ABSTRACT

A device for the reception of digital data broadcast at a high bit rate for reception by mobile receivers is disclosed. The device operates under adverse conditions of multiple propagation corresponding to the Rayleigh process and imperfect frequency tuning to minimize the inter-symbol interference in the frequency domain. The device receives a digital signal having digital elements distributed in the frequency-time space f-t and transmitted in the form of symbols each constituted by a multiplex of N orthogonal carrier frequencies modulated by a set of digital elements and broadcast simultaneously. The device includes a module for transposition by a local oscillator, baseband filtering and analog-digital conversion, a temporal windowing module for the selection of the useful samples and a mathematical transformation module, the temporal windowing module applying a Nyquist window type of temporal window with non-zero roll-off.

10 Claims, 5 Drawing Sheets

DEVICE FOR THE RECEPTION OF DIGITAL DATA TIME FREQUENCY INTERLACING, NOTABLY FOR RADIO BROADCASTING AT HIGH BIT RATE TOWARDS MOBILE RECEIVERS WITH NYQUIST TEMPORAL WINDOW

BACKGROUND AND SUMMARY OF THE INVENTION

This is a continuation-in-part of U.S. patent application Ser. No. 07/648,897 to Castelain, et al., filed Jan. 31, 1991, and abandoned in favor of the present application.

This invention relates to the reception of high bit rate digital data broadcast for reception by mobile receivers. The present invention operates under conditions of multiple propagation, corresponding to the Rayleigh Process and generating phenomena of fading, and in the presence of parasites and jamming. More generally, the invention can be applied to the reception of digital signals through channels having multiple paths allocated and with time varying characteristics.

While not being an exclusive use, the present invention can advantageously be applied to a system of digital sound broadcasting known as COFDM (Coding Orthogonal Frequency Division Multiplex) such as described in U.S. Pat. No. 4,881,241 to Pommier.

The COFDM broadcasting system relies on a method of modulation by orthogonal frequency division multiplexing (OFDM) and a channel encoding device. The digital bit rate of a given program is distributed on N broadcasting channels, i.e., on N orthogonal carriers. The constituent elements of the signal are thus distributed in the frequency domain, and also in the temporal domain. An interlacing, in time and frequency, of the digital elements makes it possible to maximize the statistical independence of the samples in relation to the Rayleigh process and the selective characteristic of the channel. In particular, this type of modulation makes it possible to prevent two successive elements of the data train from being transmitted at the same frequency.

A variety of encoding/decoding schemes can be utilized. For example, encoding may advantageously be a convolutional encoding that makes it possible to absorb the effect of the variations in amplitude of the received signal, the amplitude variation being due to the Rayleigh process. Decoding may be, for example, a maximum likelihood decoding such a Viterbi type decoding.

In known COFDM receivers, the demodulation consists chiefly of the following operations: a transposition by a local oscillator, a baseband filtering, an analog-digital conversion, the application of a temporal window for selecting useful samples in the digital train, and a discrete Fourier transform (DFT) functioning to separate the different carriers transmitted.

More precisely, the processing includes obtaining a series of samples from analog/digital conversion mechanism, followed by extraction of N consecutive samples from the series, with these N selecting samples corresponding to a symbol of the COFDM signal. The exact sampling rate can be determined by conventional engineering design considerations, and is defined so as to produce N samples per symbol. A transformation (typically DFT) is applied on the N selected symbols to obtain N transformed coefficients, with each transformed coefficient corresponding to one of the N carriers forming the COFDM. The value of N is a design choice, but N has classically been chosen to have a value between about 100 and about 10000.

This known processing is disclosed, for example, in U.S. Pat. No. 4,881,241, and particularly in relation with FIG. 9. In this known processing, the extracting of N consecutive samples can be seen as the application of a temporal rectangular window, which selects in the time domain a part of the samples.

The temporal window conventionally used is a square window, affecting each of the selected samples with an equal weight. In other words, N samples are directly directed to the DFT for each COFDM symbol. No processing is carried out between the analog/digital conversion and the DFT (see U.S. Pat. No. 4,881,241, FIG. 9).

In the multiplex of N carriers of the COFDM signal, each of the carriers is modulated independently. The frequency separation between two neighboring carriers is $1/t_s$, where $t_s$ is the duration of the useful part of a symbol.

The application, to the digital signal, of a square temporal window with a length $t_s$ followed by the DFT, may be interpreted in the frequency field as the use of a filter matched with each of the carriers, i.e. also as a perfect sampling of the signal in this frequency domain.

The absence of any inter-symbol distortion during this frequency sampling is ensured by the position of the zeros of the function sine $x/x$, by the Fourier transform of the square window as well as by the assumption of a perfect determining of the sampling points in frequency.

However, the assumption of perfect determination of sampling points of frequency is not always met because of the distortions introduced by the transmission channel (for example the Doppler effect). More simply, frequency determination may not be perfect because of a defect in the servo-control link between the local oscillator and the received signal, notably because of the precision of the automatic frequency control (AFC). In such a case, an inter-symbol interference appears in the frequency domain.

The present invention is intended to overcome problems with inter-symbol interference. More precisely, the present invention provides a device that minimizes the inter-symbol interference in the frequency domain in the case of an imperfect frequency tuning. This effectively increases resistance to distortions introduced by Doppler effect.

Another aim of the invention is to provide a device that does not require modification of either the structure of the transmitted signal or the receiver. Use of the device of the invention is optional, with its presence improving quality of the decoded signal, but not being necessary for signal processing.

These aims, as well as others that shall appear here below, are achieved by means of a device minimizing the effect of the loss of orthogonality of the carrier frequencies at the reception of a digital signal, of the type constituted by digital elements distributed in the frequency-time space-f-t transmitted in the form of symbols each constituted by a multiplex of N orthogonal carrier frequencies modulated by a set of digital elements and broadcast simultaneously. Such a system is notably designed for radio broadcasting at high bit rate towards mobile receivers, including a module for transposition by a local oscillator, baseband filtering and analog-digital conversion, a temporal windowing module for the selection of the useful samples and a mathematical transformation module wherein said temporal windowing module applies a Nyquist window type of temporal window with non-zero roll-off.

The term "roll-off", commonly used by those skilled in the art, is sometimes replaced by the substitute term "fall-out coefficient". However, this term does not have exactly the same scope. As defined herein, the term "roll-off" designates the width of the flanks of a window.

In the case of a device applied to a digital signal including a guard interval between each of said symbols, the base of said Nyquist temporal window advantageously has a width that is smaller than the half-width of said guard interval.

A window such as this has the advantage wherein, by Fourier transform, it produces secondary lobes with an amplitude or amplitudes smaller than the amplitude or amplitudes produced by a square window. This devices carries out a transposition of the known Nyquist analysis to the frequency domain. Preferably, each of the flanks of said Nyquist temporal window is a half-period sinusoidal arch. Use of this type of Nyquist window makes it possible to obtain lobes with very small amplitudes.

Advantageously, said windowing module, after the application of said Nyquist window, achieves a folding of the first samples selected on the last samples selected, and a summing of said first samples with said last samples. This makes it possible to reduce the number of samples obtained by the Nyquist window to the number of samples given by a standard square window.

In a preferred embodiment of the invention, the device has a mechanism for the detection of the distortions of the channel, and a mechanism for servo-control of the roll-off as a function of said distortions. Advantageously, said mechanism for servo-control of the roll-off allow selection between a window with zero roll-off and a window with non-zero roll-off.

The different aspects of the embodiment that shall be described hereinafter more particularly concern digital sound radio broadcasting towards mobile receivers. However, as those skilled in the art will appreciate, the principle of digital broadcasting with a high bit rate, according to the invention, can be applied to any type of communications, particularly in channels subject to the Rayleigh process amplitude variations.

BRIEF DESCRIPTION OF THE DRAWINGS

Other characteristics and advantages of the invention will appear from the following description of a preferred embodiment of the invention, given as an exemplary and non-restrictive illustration, and from the appended drawings, of which.

DETAILED DESCRIPTION OF THE INVENTION

One goal in the application of digital sound radio broadcasting may be, for example, the transmission of sixteen stereophonic program in an 8 MHz wide frequency band with a digital bit rate of the order of 250 kbits with compression by stereophonic program.

Figure 1:
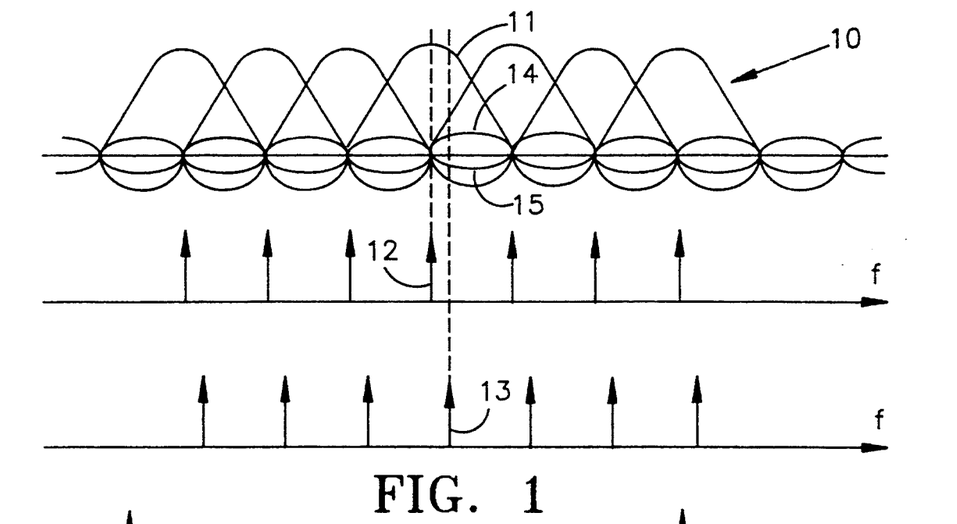
FIG. 1 illustrates the positioning of the bank of reception filters set up by the Fourier transform in relation to the carriers of the signal received in a known type of receiver, in the case of perfect and imperfect tunings of the local oscillator.

FIG. 1 represents the transfer function 10 of the equivalent bank of filters achieved by the Fourier transform. It is formed by the juxtaposition of the transfer functions of the elementary filters 11, each corresponding to one of the carriers of the received signal. The transfer function of one of these elementary filters follows a sine (x)/x relationship when a square temporal window is used.

The position of each of the carriers 12 of the received signal, when the frequency sampling is perfectly done, i.e. when there is no Doppler effect and when there is a fault in the servo-control of the AFC, corresponds to a maximum of one of the elementary filters 11 and to the minimum values of the other filters. This ensures that there will be no inter-carrier interference during this frequency sampling.

In the event, for example, of a fault in the servo-control of the local oscillator, the position of a given carrier 13 affects the output of several of the elementary filters 11, 14, 15 and its position no longer coincides with the minimum values of these filters. Inter-carrier interference is then introduced into the output of each of the elementary filters of the bank of filters 10.

The principle of the present invention lies in the use of a non-square temporal window, the secondary lobes of which, by Fourier transform, decrease more swiftly than the sine (x)/x function. For example, this window may be of the "Nyquist" type, although this term ordinarily corresponds to transfer functions in the frequency domain of the bank-reducing filters, the aim in this case being that of keeping to the instants of sampling in the temporal domain.

In other words, according to the invention, the samples produced by analog/digital conversion mechanism are not directly fed through the DFT. Instead, the samples are first selectively weighted according to a weighting that corresponds to the application of a temporal Nyquist window. This procedure is therefore an inventive transposition of the Nyquist analysis, usually performed in the temporal domain, into the frequency domain, in taking account of the characteristics of the COFDM signal.

The temporal window chosen must be such that no distortion is introduced during the frequency sampling, when the local oscillator is perfectly locked into its nominal value, and when no disturbance is contributed by the transmission channel. If F(f) is the Fourier transform of the temporal window f(t), this means simply that:

$$F(k/t_s) = k \in Z \text{ and } k \neq 0$$

It is shown that this is true when the temporal window checks the first Nyquist criterion.

Figure 7:
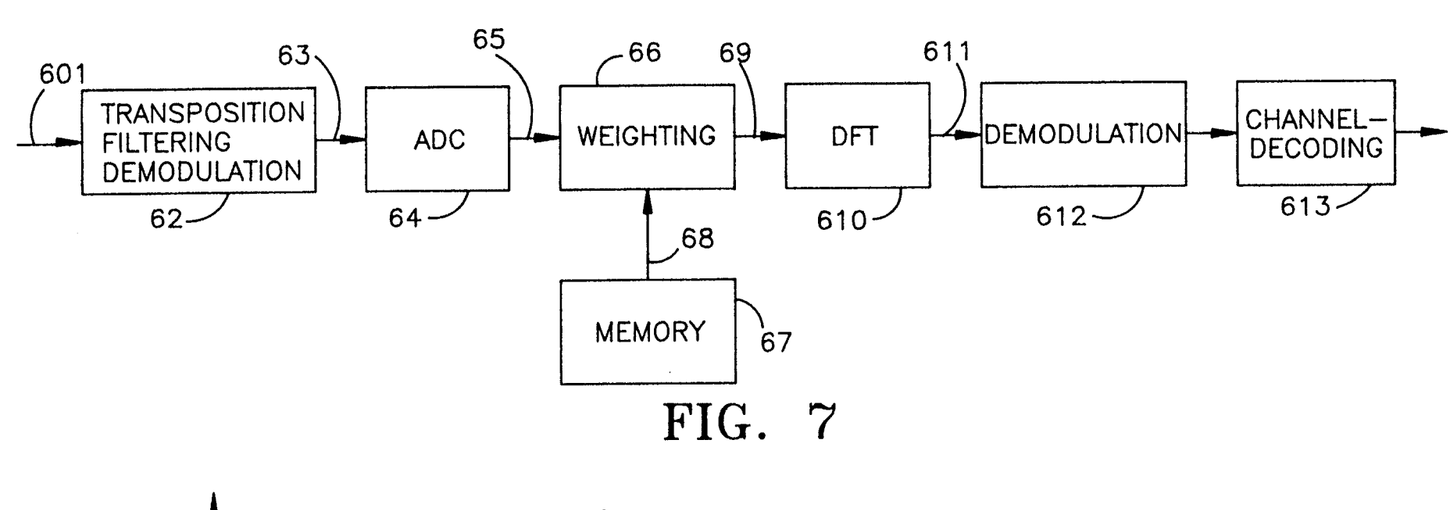
FIG. 7 is a block diagram of a receiver according to the invention.

FIG. 7 is a schematic block diagram of a receiver of COFDM signals including temporal windowing means according to the invention. A received COFDM signal 601 (transmitted as disclosed in Pommier) is classically transposed at an intermediary frequency (IF), filtered by a pass-band filter whose bandwidth corresponds to the whole spectrum required by the set of N frequency carriers and demodulated to obtain a baseband signal 63 made of the N frequency carriers, in a module 62 of transposition, filtering and demodulation. The baseband signal 63 is then digitized in analog/digital conversion means 64 providing temporal samples 65, at a rate of $t_s/N$, where $t_s$ is the duration of the useful part of a symbol of the COFDM signal (each symbol including a useful part and a guard interval) and N is the number of frequency carriers (so as to obtain N samples $S_1$ to $S_N$.

The samples 65 are fed in weighting means 66 which multiply each received sample with a predetermined weighting coefficient 68 which is stored in a memory 67. The weighting coefficients 68 are designed so as to apply a Nyquist window to a series of temporal samples.

Figure 8:
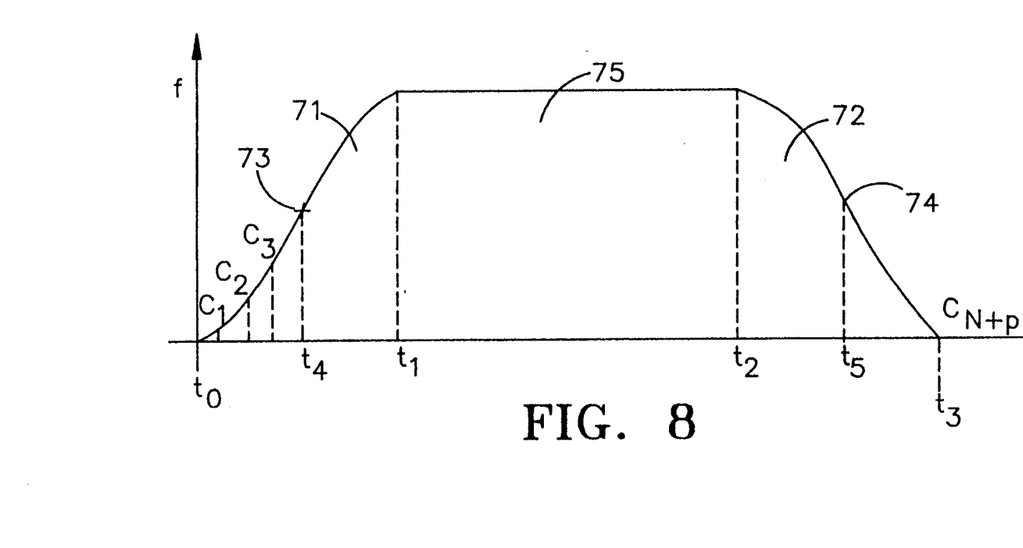
FIG. 8 is an illustration of a temporal Nyquist window used according to the invention.

A Nyquist temporal window is shown on FIG. 8. As known in the art (but for frequential windows), a Nyquist window has two flanks 71 and 72 which are symmetric regarding one with the other and which each presents an odd symmetry regarding the middle 73, 74 of the flank. Between the two flanks stands a maintaining part 75, having a constant value.

Such windows (in the frequential domain) are e.g. shown in Proakis, "Digital Communications" (McGraw-Hill, 1989/83), pp. 532–536).

Thus, if f is the function defining the Nyquist window, it meets the following equations: ascending flank 71 (from $t_0$ to $t_1$; duration $t_f = t_1 - t_0$):

```
ascending flank 71 (from t0 to t1; duration tf=t1−t0):
    f(t0) = 0
    f(t1) = 1
    f(t−t4) + f(t+t4) = 1 with t0 <t <t1
        t4 middle of [t0, t1]
        (i.e. odd symmetry regarding t4);
    maintaining part 75 (from t1 to t2; duration
tm = t2−t1);
    f(t) = 1 (=f(t1)=f(t2)) with t1 <t <t2;
    descending flank 72 (from t2 to t3; duration
tf = t3 − t2);
    f(t3) = 0
    f(t2) = 1
    f(t−t5) + f(t+t5) = 1 with t2 <t <t3
        t5 middle of [t2, t3]
        (i.e. odd symmetry regarding t5).
```

The values $t_m$ and $t_f$ are chosen (design choice) so that:

the duration of the maintaining part $t_m$ is equal to the duration of $t_s$ of a symbol (so as to include N temporal samples);

the duration $t_f$ of each flank induces a sufficient minimizing of the inter-symbol interference (it would be seen that this duration can vary). The two flanks 71 and 72 include p temporal samples, which are supplementary samples (regarding a classical square window), corresponding to parts of the signal which are respectively before and after the symbol. In the case of the COFDM, they are included in a guard interval which is inserted between each symbol and in which no useful signal is emitted.

More generally, these durations could be chosen so that $t_m + 2t_f < t_s \Delta$, where $\Delta$ is the duration of the guard interval.

Practically, the application of the window on the series of samples 65 consists in multiplying each sample with a weighting coefficient 68 which is deduced from the previous equations. Therefore, the window of FIG. 8 is digitized, at the digitizing rate used in the ADC means 64, providing at least N+p weighting coefficients $c_1$ to $c_{N+p}$ which are stored in the memory 67 (e.g. a ROM).

The weighting 66 consists, for each symbol of the signal, in the processing the product $C_i*S_i (1 \leq i \leq N+p)$, so as to fed weighted coefficients 69 in a DFT (Digital Fourier Transform) module 610 (Consequently, the DFT will process N+p samples). After the Fourier transform 610, the transformed coefficients 611 are classically demodulated (612) (differential or coherent demodulation), and channel decoded (613) (de-interlacing the Viterbi decoding), as disclosed in Pommier.

It should be noted that the only differing part of the decoder of FIG. 7, regarding Pommier, is the weighting of the temporal samples 65, prior to the DFT 610. With the writing conventions of the COFDM system, the previous equations can read as follows:

$$f(-t_r/2+x) + f(-t_r/2-x) = 1$$

$$f(t_s-t_r/2+x) + f(t_s-t_r/2-x) = 1 \text{ with } 0 \leq x \leq t_r/2$$

where $f(t) = 1$ for $0 < t < t_s - t_r$ and where $t_s$ is the duration of the useful part of a symbol and $t_r$ represents the width of the rising and descending edges of the window. This value $t_r$ should verify:

$t_r \leq \Delta$, where $\Delta$ is the length of the guard interval. This duration $t_r$ is clearly a matter of design choice (the more the duration is long, the more the number of non-zero weighting coefficients is high).

Figure 3:
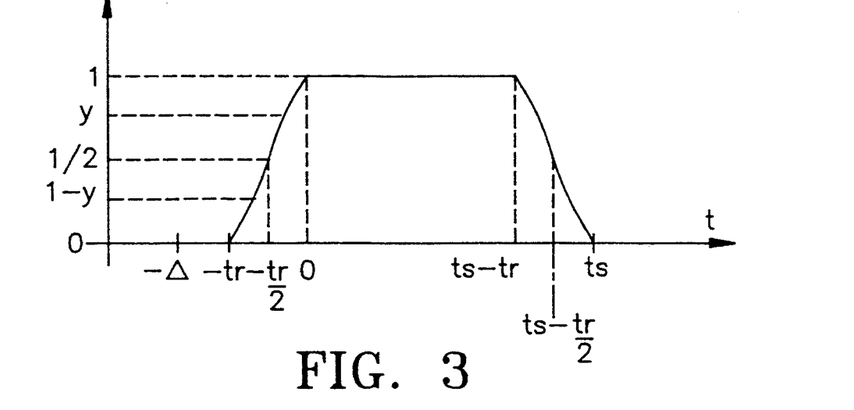
FIG. 3 represents an elevated cosine type of Nyquist window.

Among all the usable Nyquist windows, the only ones that will be chosen are obviously those that offer the possibility of rapid decrease in their Fourier transform when the frequency rises. A certain number of windows verifying this property are listed in the current literature (see e.g. Proakis, previously cited). Notably, windows having a continuous derivative at every point and, preferably, windows having flanks $31_A$, $31_B$ that are half-period sinusoidal arches will be used.

For example, it is possible to use the so-called "elevated" cosine window shown in FIG. 3, and defined by:

$$f(x) = \tfrac{1}{2} + \tfrac{1}{2} \text{ sine } \pi/t_r(x+t_r/2) \text{ for } -t_r \leq x \leq 0$$

$$f(x) = 1 \text{ for } 0 < x < t_s - t_r$$

$$f(x) = \tfrac{1}{2} - \tfrac{1}{2} \text{ sine } \pi/t_r(x-t_s+t_r/2) \text{ for } t_s - t_r < x < t_s$$

Figure 2:
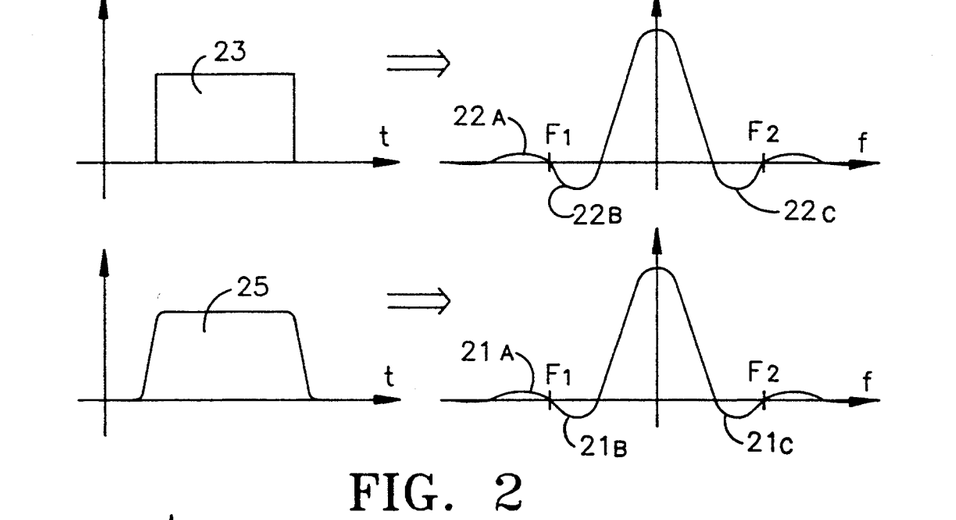
FIG. 2 represents the frequency responses of a square temporal window and a Nyquist temporal window.

FIG. 2 compares the decrease of the secondary lobes of the Fourier transform for a square temporal window and a Nyquist type temporal window.

The secondary lobes $21_A$, $21_B$, $21_C$ produced by the Nyquist window 25 have a smaller amplitude than the lobes $22_A$, $22_B$, $22_C$, produced by the square window 23. The two types of response obviously cancel each other out at the same frequencies $F_1$, $F_2$, in such a way that the frequency sampling introduces no inter-carrier interference when the transmission channel is perfect, i.e. when there is no Doppler effect and when the frequency tuning is perfectly achieved.

Figure 4:
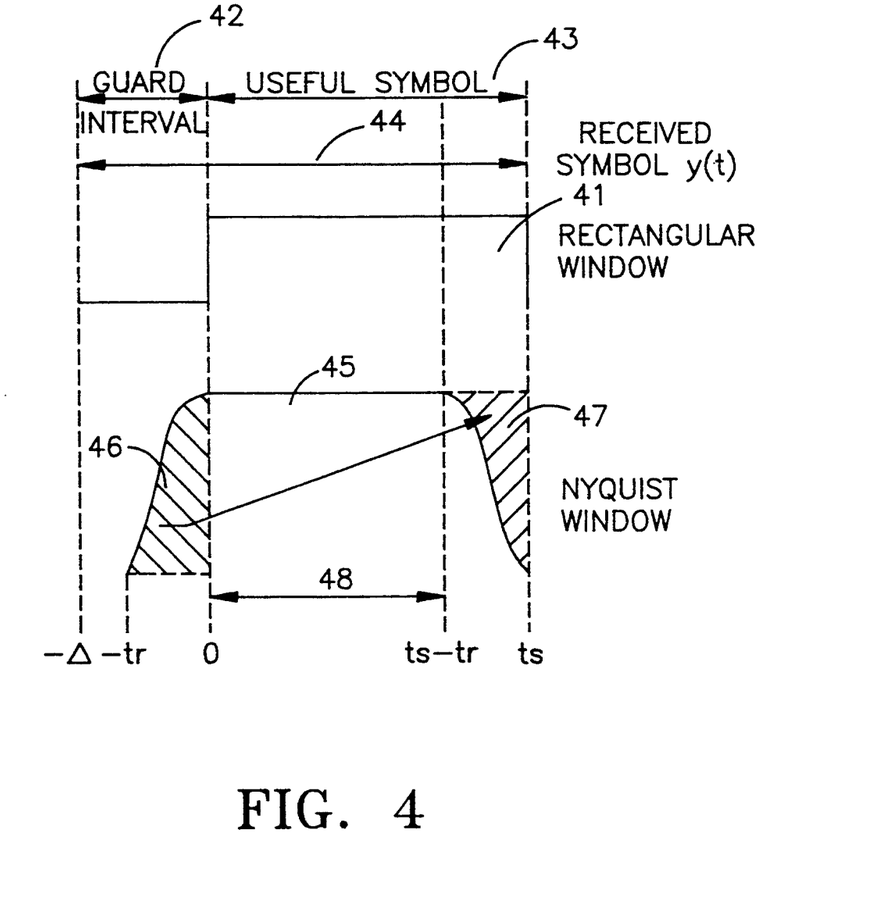
FIG. 4 represents the characteristics of a Nyquist window according to the invention, in the COFDM environment.

The use of a Nyquist window instead of a square window necessitates the temporal widening of this window, as can be seen in FIG. 4.

Indeed, a standard square window 41 is defined in such a way as to take account of only the useful part 43 of a symbol 44, and not the guard interval 42, in order to avoid inter-symbol interference in the temporal domain.

In the case of a Nyquist window 45, it is necessary for this window to be wider. More precisely, the transitions 46, 47 of the filter should act on samples that are usually not used in the case of a square window.

In order to prevent any inter-symbol interference, the duration $t_r$ of the two transitions are chosen so that $t_r$ is smaller than or equal to $\Delta$, the duration of the guard interval 42.

In the general case of the invention, the maintaining part 75 of the window may be as long as a classical square window, so as to obtain N useful samples with no weighting (i.e. associated with a weighting coefficient equal to 1). Therefore, the complexity of the processing is substantially increased: more than N samples are taken in account for each samples, including non-useful samples corresponding to the flanks of the window (these samples are non-useful for the following processings (DFT, decoding ... ). However, they are useful for limiting the intersymbol interference). In the particular case of the COFDM, the complexity introduced by the increase in the number of samples may be reduced. Indeed, it is possible to bring the part beneath the rising edge 46 of the window to within the useful symbol, in folding the part 46 beneath the rising edge on the part 47 beneath the descending edge and to sum up these two parts. Thus, the number of coefficients to be processed by the Fourier transform is identical to that obtained in the case of a square window. In this particular case, it will be noted that the maintaining part of the window does not cover N samples, as previously disclosed in relation with FIG. 8, but only $N-p/2$ samples. The p/2 missing samples (necessary for the DFT) are provided by the folding of the p/2 first samples (ascending flanks) on the p/2 last samples (descending flank).

Indeed, if we consider y(t) to be the signal before windowing and z(t) to be the signal after windowing, y being defined for $-\Delta \leq t \leq t_s$, and z(t) for $0 \leq t \leq t_s$.

In the case of a non-square window f(t), the transformation becomes:

$$z(t)=y(t) \text{ for } 0 \leq t \leq t_s$$

$$z(t)=f(t)\,y(t)+f(t-t_s)y\,(t-t_s) \text{ for } t_s-t_r<t \leq t_s$$

It is known that carrying out an N-point discrete Fourier transform on this signal z(t) is equivalent to carrying out a 2N-point transform on the signal y(t)f(t) (extended by zeros so that it has the desired duration $2t_s$), and to then keeping only one out of two points.

If the window is of the Nyquist type (and symmetrical), $$f(t)+f(t-t_s)=\tfrac{1}{2}.$$

Furthermore, if no distortion is introduced into the signal, i.e. if y(t)=x(t) where x(t) is the transmitted signal, the following is obtained according to the property of the guard interval of the COFDM signal:

$$y(t-t_s)=x(t-t_s)=x(t).$$

It is then ascertained that z(t)=x(t): no distortion is introduced by the windowing if the transmission channel is perfect, i.e. notably if the AFC is perfectly aligned.

It must be noted that this device necessitates no modification of the transmitted signal, and this ensures its compatibility with the existing systems.

Figure 5:
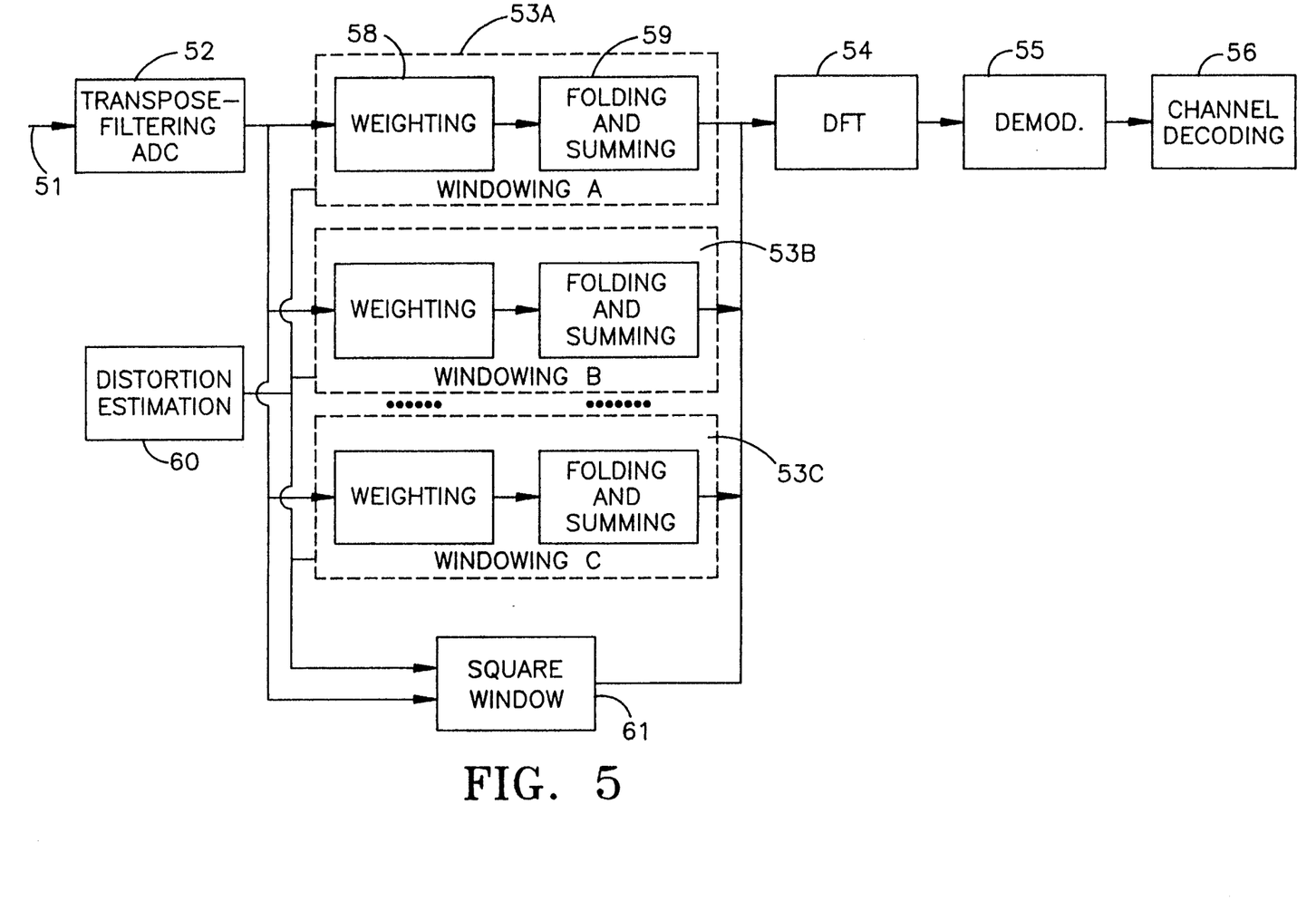
FIG. 5 is a block diagram of a receiver of COFDM signals according to the invention.

FIG. 5 shows a particular embodiment of a receiver according to the invention.

Figure 6:
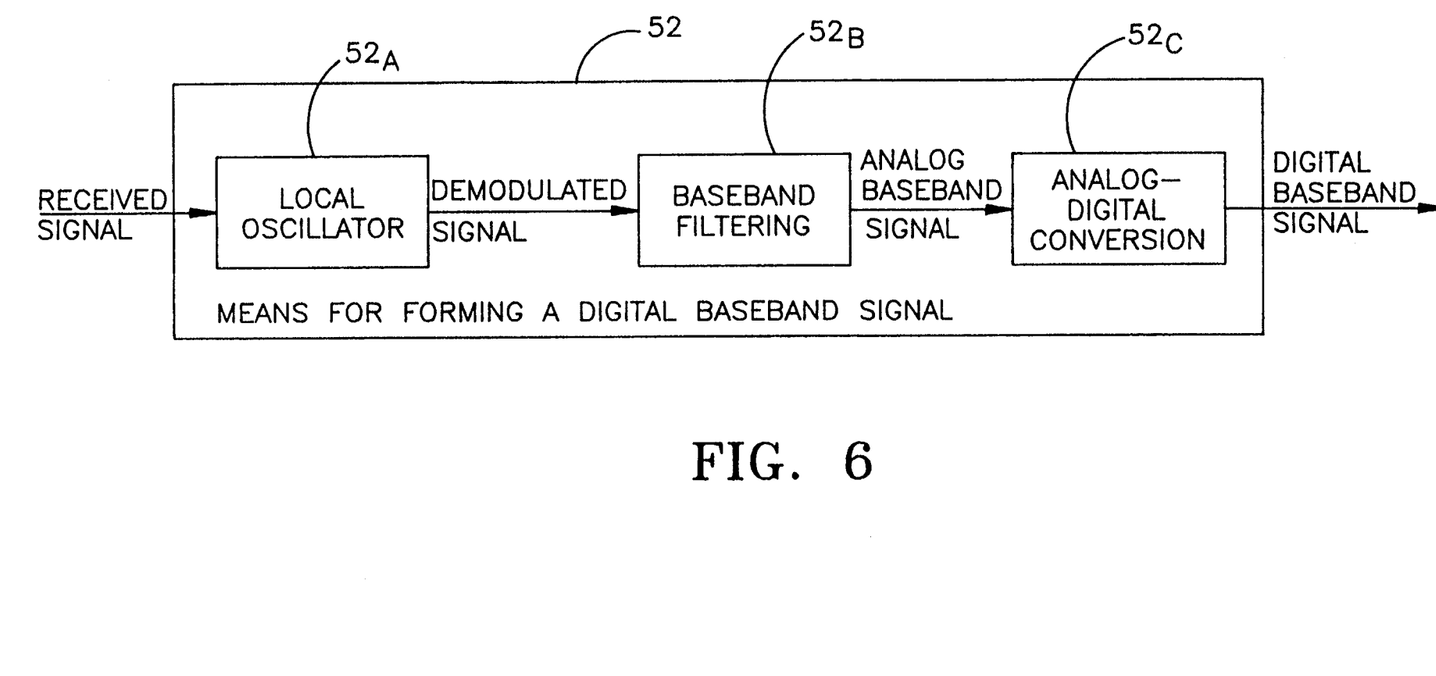
FIG. 6 is a block diagram of a means for forming a digital baseband signal.

The received signal 51 is, first of all, in a known way, subjected to a module 52 for forming a digital baseband signal as shown in FIG. 6. Module 52 comprises a local oscillator $52_A$, and baseband filter $52_B$, and an ADC $52_C$ for the transposition, filtering and analog/digital conversion of the entire COFDM signal.

The digital signal obtained is then subjected to the windowing module $53_A$. Then, a Fourier transform (DFT) 54 is carried out, then a demodulation 55, which is differential or coherent, and the channel decoding 56.

The windowing module $53_A$ initially registers $N+p$ points (N being the number of useful samples and p the number of samples included beneath the edges of the window) and performs a weighting operation 58, corresponding to the application proper of the Nyquist window and, finally, the folding and summing 59 of the samples of the first flank of the window with the second one and, more precisely, of the p/2 first samples with the p/2 second samples.

More precisely, the weighting module 58 carries out the weighting of $N+p$ successive samples corresponding to a symbol, as disclosed on FIG. 7. The $N+p$ weighted samples $ws_1$ to $ws_{N+p}$ are temporarily stored in the folding and summing module 59, which fed the DFT module 54 with final samples $fs_1$ to $fs_N$ as follow:

$$fs_i=ws_{p/2+i} \text{ for } 1 \leq i \leq N-p/2 \text{ (part 48, FIG. 4)}$$

$$fs_i=ws_{i-N+p/2} \text{ for } N-p/2<i \leq N \text{ (part 49:folding and summing of 46 on 47).}$$

Advantageously, the windowing may be adapted to the level of the distortions. In this case, a module 60 for the estimation of the distortions selects one particular window among several windows $53_A$, $53_B$, $53_C$, . . . . The module 60 can e.g. determines the level of distortions by analyzing a symbol of silence which is regularly emitted, as disclosed in U.S. Pat. No. 5,191,576. During this symbol of silence, no signal is emitted. The received signal therefore corresponds to distortions. This distortion signal is compared with different thresholds. The module 60 selects one of the windows, as a function of the overcome thresholds.

The selection can also takes account of the speed of the mobile.

Each of these windows $53_A$, $53_B$, $53_C$ has a different "roll-off" (or fall-out coefficient, but works similarly, as previously disclosed for the window $53_A$. In other words, each of these windows selects a different number of samples, and applies a different weighting during the flanks of the window. It is possible, in particular, to have a standard square window 61 no flanks, i.e. no particular weighting, and one or more windows according to the invention.

Indeed, it is known that when a vehicle moves slowly, there is little Doppler effect. The roll-off can then be reduced. Conversely, the faster the vehicle moves, the greater will be the tendency to choose a wide window. Another phenomenon also has to be taken into account, namely the spread of the pulse response of the transmission channel. Thus, in the presence of long echos, i.e. of a very dispersive channel, the pulse response will be spread in time, and it will therefore be useful to reduce the roll-off.

Therefore, the module 60 processes as increasing the duration of the flanks of the window when the level of distortions increases; increasing of the duration of the flanks of the window when the speed of the mobile increases; and reducing of the duration of the flanks of the window when the duration of the echoes increase.

Many other modes of implementing the invention will appear clearly to those skilled in the art. In particular, it should be noted that the maintaining part of the Nyquist window can be lower or higher than the exact duration of the useful part of a symbol.

What is claimed is:

1. A receiver of a digital source signal, comprising digital symbols, transmitted using a plurality of simultaneously broadcast orthogonal frequency carriers, the receiver comprising:
   means for forming a digital baseband signal from a received signal including:
   a local oscillator for transposing the received signal into a demodulated signal,
   baseband filtering means for filtering the demodulated signal to form an analog baseband signal, and
   analog-digital conversion means for digitizing the analog baseband signal to form the digital baseband signal consisting of successive temporal samples;
   a temporal windowing module coupled to said analog-digital conversion means for forming a series of successive samples the temporal windowing module including means for weighting said digital baseband signal, the weighting being carried out according to a Nyquist temporal window with non-zero roll-off having a first ascending flank with duration $t_r$, a constant portion with duration $t_s - t_r$, where $t_s$ and $t_r$ are predetermined time periods, and a second descending flank symmetric to the first ascending flank, the Nyquist temporal window being defined by a mathematical function f simultaneously meeting the following conditions, x being a real variable representing time:

$f(-t_r/2+x)+f(-t_r/2-x)=1$ for $0 \leq x \leq t_r/2$;

$f(t_s-t_r/2+x)+f(t_s-t_r/2-x)=1$ for $0 \leq x \leq t_r/2$; and $f(x)=1$ for $0 \leq x \leq t_s-t_r$; and transformation means for mathematically transforming said series of successive samples into a set of frequential coefficients thus forming a transformed signal.

2. A receiver according to claim 1 further comprising detecting means coupled to said windowing module for detecting the level of distortions present in the received signal and means for servo-controlling the roll-off coupled to the detecting means, the detecting means feeding said means for servo-controlling with a piece of information representative of said level of distortions the servo-controlling being accomplished by controlling the duration $t_r$ of said first and second flanks of said Nyquist temporal window as a function of the piece of information representative of the level of distortions.

3. A receiver according to claim 2, wherein said means for servo-controlling the roll-off includes means for making a selection between a rectangular temporal window with zero roll-off and at least one Nyquist temporal window with non-zero roll-off, said means for making a selection selecting one of said temporal windows as a function of said piece of information.

4. A receiver of digital source signal, comprising digital symbols, transmitted using a plurality of orthogonal frequency carriers, said plurality of orthogonal frequency carriers being broadcast simultaneously, the receiver including:
   means for forming a digital baseband signal from a received signal including:
   a local oscillator for transposing the received signal into a demodulated signal,
   baseband filtering means for filtering the demodulated signal to form an analog baseband signal, and
   analog-digital conversion means for digitizing the analog baseband signal to form the digital baseband signal consisting of successive temporal samples;
   a temporal windowing module for forming a series of successive temporal samples to be transformed by transformation means, the temporal windowing module including:
   means for weighting a series of said successive temporal samples according to a predetermined weighting shape, said weighting shape being a Nyquist temporal window with non-zero roll-off comprising:
   a first ascending flank having odd symmetry and with a predetermined duration $t_r$,
   a constant portion with a predetermined duration $t_s - t_r$ and
   a second descending flank symmetric to the first ascending flank; and
   transformation means for mathematically transforming said series of successive samples into a set of frequential coefficients thus forming a transformed signal.

5. A receiver according to claim 1, wherein said digital baseband signal includes a guard interval between said symbols, the base of said Nyquist temporal window having a width that is smaller than the half-width of said guard interval.

6. A receiver according to claim 1 wherein each of the flanks of said Nyquist temporal window is a half-period sinusoidal arch.

7. A receiver according to claim 1 wherein said windowing module achieves Nyquist temporal window weighting by forming said series of successive samples comprising a first set of samples corresponding to said ascending flank, a second set of samples corresponding to said constant portion and a third set of samples corresponding to said descending flank; and sums the samples of said first set with the samples of said third set.

8. A receiver according to claim 4, wherein said digital baseband signal includes a guard interval between said symbols, the base of said Nyquist temporal window having a width that is smaller than the half-width of said guard interval.

9. A receiver according to claim 4 wherein each of the flanks of said Nyquist temporal window is a half-period sinusoidal arch.

10. A receiver according to claim 4 wherein said windowing module achieves Nyquist temporal window weighting by forming said series of successive temporal samples comprising a first set of samples corresponding to said ascending flank, a second set of samples corresponding to said constant portion and a third set of samples corresponding to said descending flank; and sums the samples of said first set with the samples of said third set.

* * * * *